(12) United States Patent
Mefford

(10) Patent No.: US 8,016,172 B1
(45) Date of Patent: Sep. 13, 2011

(54) STORAGE RACK ASSEMBLY FOR VEHICLE

(75) Inventor: Dan A. Mefford, Pittsfield, IL (US)

(73) Assignee: Dan A. Mefford, Pittsfield, IL (US)

( * ) Notice: Subject to any disclaimer, the term of this patent is extended or adjusted under 35 U.S.C. 154(b) by 961 days.

(21) Appl. No.: 11/865,586

(22) Filed: Oct. 1, 2007

(51) Int. Cl.
*B60R 9/045* (2006.01)

(52) U.S. Cl. ......... 224/321; 224/319; 224/320; 224/325

(58) Field of Classification Search ............. 224/309, 224/317, 319, 320, 321, 322, 325, 329, 551; D12/412; *B60R 9/00, 9/04, 9/045, 9/052, B60R 9/055*
See application file for complete search history.

(56) References Cited

U.S. PATENT DOCUMENTS

| | | | | |
|---|---|---|---|---|
| 2,589,772 A * | 3/1952 | Carter et al. | ............. | 224/320 |
| 2,596,860 A * | 5/1952 | McCrory et al. | ............. | 224/325 |
| 4,065,041 A * | 12/1977 | Stegavig et al. | ............. | 224/327 |
| 4,641,769 A * | 2/1987 | Ten Angel | ............. | 224/314 |
| 4,773,575 A * | 9/1988 | Morrison, III | ............. | 224/405 |
| 5,037,152 A | 8/1991 | Hendricks | | |
| 5,104,015 A | 4/1992 | Johnson | | |
| 5,340,007 A | 8/1994 | Jeuffray | | |
| 5,366,128 A | 11/1994 | Grim | | |
| 5,464,140 A | 11/1995 | Hill | | |
| 5,746,362 A | 5/1998 | Hickey | | |
| 5,848,743 A * | 12/1998 | Derecktor | ............. | 224/331 |
| D413,562 S | 9/1999 | Van Dusen | | |
| D454,329 S * | 3/2002 | Buseman | ............. | D12/412 |
| 6,425,508 B1 * | 7/2002 | Cole et al. | ............. | 224/320 |
| D481,003 S | 10/2003 | Bauer | | |
| 6,712,247 B1 | 3/2004 | Fox | | |
| 6,817,500 B2 | 11/2004 | Neaux | | |
| D508,015 S | 8/2005 | Badillo | | |
| 7,014,236 B2 | 3/2006 | Kerns | | |
| D520,938 S | 5/2006 | Badillo | | |
| D540,736 S | 4/2007 | Harris | | |
| 2005/0023314 A1 * | 2/2005 | Williams et al. | ............. | 224/405 |

FOREIGN PATENT DOCUMENTS

| | | |
|---|---|---|
| DE | 10260280 A1 * | 7/2004 |
| EP | 1842727 A1 * | 10/2007 |
| JP | 09024770 A * | 1/1997 |
| JP | 2000190874 A * | 7/2000 |

* cited by examiner

*Primary Examiner* — Justin Larson
(74) *Attorney, Agent, or Firm* — Wildman, Harrold, Allen & Dixon LLP

(57) ABSTRACT

A storage rack assembly in kit form is particularly adapted for use on a vehicle and includes a small number of different types of components to simplify shipping, assembly and installation by a purchaser. The storage rack includes side, front and back generally flat panels connected together to form a generally rectangular structure. Opposed side panels are connected to opposed ends of plural elongated cross members which are arranged in a spaced manner along the length of the rectangular structure and are aligned in a common plane to form a flat support bed in the storage rack. Plural telescoping support/mounting members are each connected to a respective cross member to allow for varying the storage rack's width depending on vehicle size and are adapted for secure attachment to the vehicle. Incorporating additional interfitting side panels and cross members allows for increasing the storage rack's length.

1 Claim, 6 Drawing Sheets

US 8,016,172 B1

STORAGE RACK ASSEMBLY FOR VEHICLE

FIELD OF THE INVENTION

The present invention relates generally to storage containers and is particularly directed to an adjustable storage rack assembly for mounting to the roof of a vehicle for holding virtually any type of cargo item such as bales of hay on a horse trailer.

BACKGROUND OF THE INVENTION

Storage racks for vehicles such as cars, trucks and trailers are frequently mounted to the vehicle's roof and are designed to carry various cargo items. These types of storage racks are typically comprised of high-strength, metal components which are welded together to form a large, unitary structure of fixed dimensions. The storage rack is typically secured to the roof, or upper portion, of the vehicle by weldments or mounting brackets and nut and bolt combinations. The typical roof storage rack is comprised of large components, is of considerable weight, and is cumbersome to pack and ship. Because of its fixed dimensions and mounting arrangement, the typical vehicle storage rack is not adapted for use with vehicles having a range of sizes and roof dimensions.

The present invention addresses the aforementioned limitations of prior art vehicle storage racks by providing a storage rack assembly in kit form which is easily shipped, assembled and installed by a purchaser. The inventive vehicle storage rack assembly may be adjusted in all three dimensions, i.e., length, width and height above the vehicle, to accommodate various vehicle sizes and roof configurations and dimensions, as well as large cargo items.

OBJECTS AND SUMMARY OF THE INVENTION

Accordingly, it is an object of the present invention to provide a roof storage rack assembly for a vehicle, such as an automobile, a truck, or a trailer, which is particularly adapted for manufacture and sale in kit form and is easily assembled and installed.

It is another object of the present invention to provide a roof cargo rack for a vehicle which is adjustable in height, width and length to accommodate a wide range of vehicle and vehicle roof sizes and shapes.

A further object of the present invention is to provide a lightweight, high-strength roof storage rack which is comprised of small components which are easily shipped, assembled and installed on a vehicle, and easily removed from the vehicle, by a purchaser.

A still further object of the present invention is to provide an improved rack for a vehicle which is particularly adapted for carrying hay and other heavy, oversized cargo on the roof of the vehicle, such as a truck or trailer for hauling horses.

The present invention contemplates a storage rack assembly for a vehicle comprising at least one each of a forward panel and an aft panel; at least one each of a first side panel and a second, opposed side panel, wherein the forward and aft panels are adapted for coupling to respective forward and aft end portions of the first and second side panels in forming a generally rectangular frame; plural elongated, linear members arranged in a spaced, parallel manner between the forward and aft panels and connected at opposed ends to the first and second side panels; and plural mounting members adjustable in length and attached to at least some of the elongated, linear members for attaching the storage rack assembly to lateral portions of the vehicle and allowing the width of the storage rack assembly to be varied, as desired.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1a is an enlarged perspective view of a portion of the storage rack assembly shown in FIG. 1;

FIG. 2a is an enlarged perspective view showing additional details of a portion of the storage rack mounting assembly illustrated in FIG. 2;

FIG. 2b is an enlarged perspective view of a portion of a support/mounting member for use in securely mounting a storage rack to an upper portion of a vehicle in accordance with the present invention;

FIG. 2c is a perspective view of an end portion of a mounting strip used in securely mounting a storage rack to an upper portion of a vehicle in accordance with the present invention;

FIGS. 3a and 3b are enlarged perspective views of two portions of the storage rack shown in FIG. 3 illustrating additional details of the connections between various storage rack components;

DETAILED DESCRIPTION OF THE PREFERRED EMBODIMENTS

Figure 1:
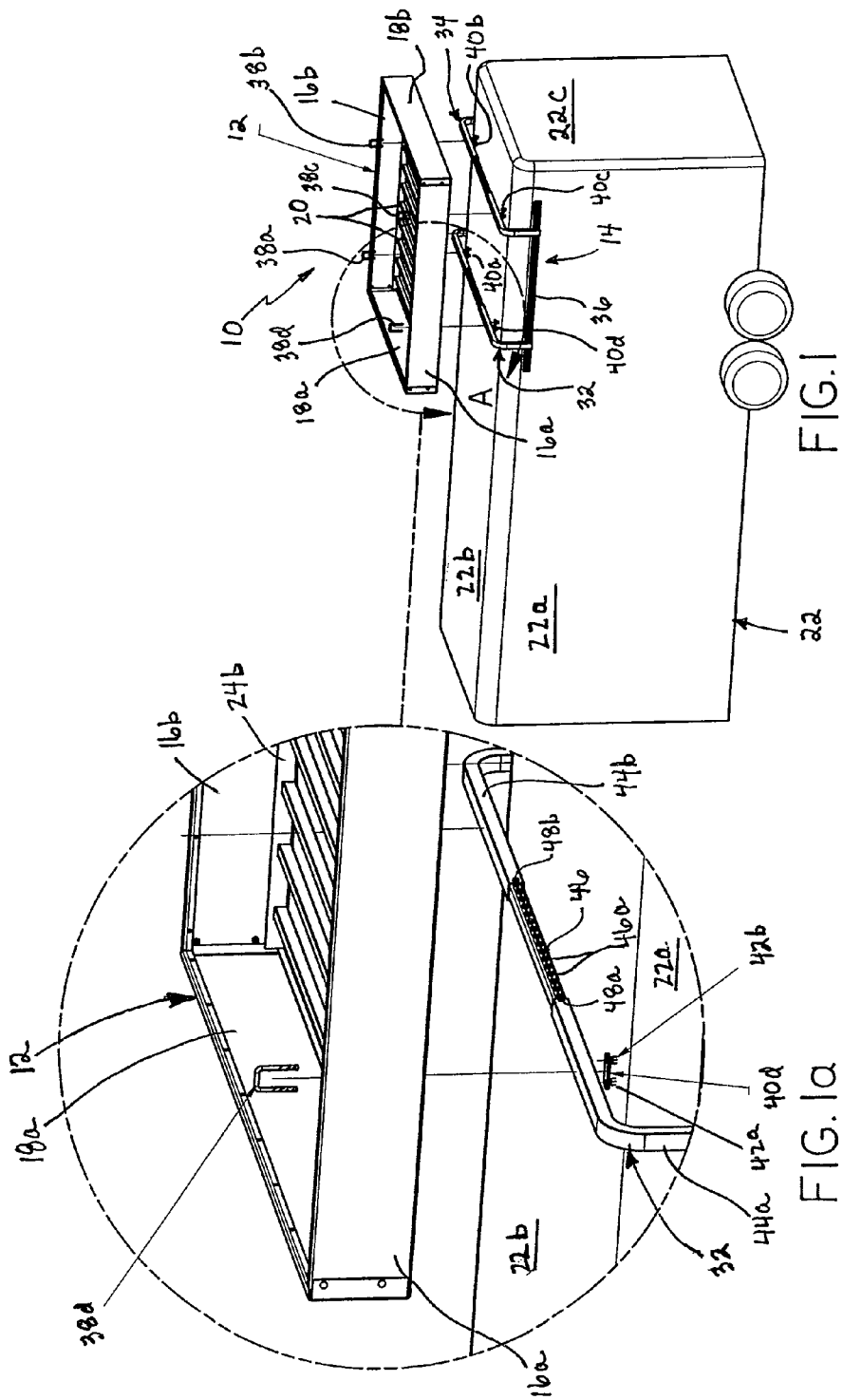
FIG. 1 is a partially exploded perspective view of a storage rack assembly mounted to an upper portion of a vehicle in accordance with one embodiment of the present invention.
Figure 2:
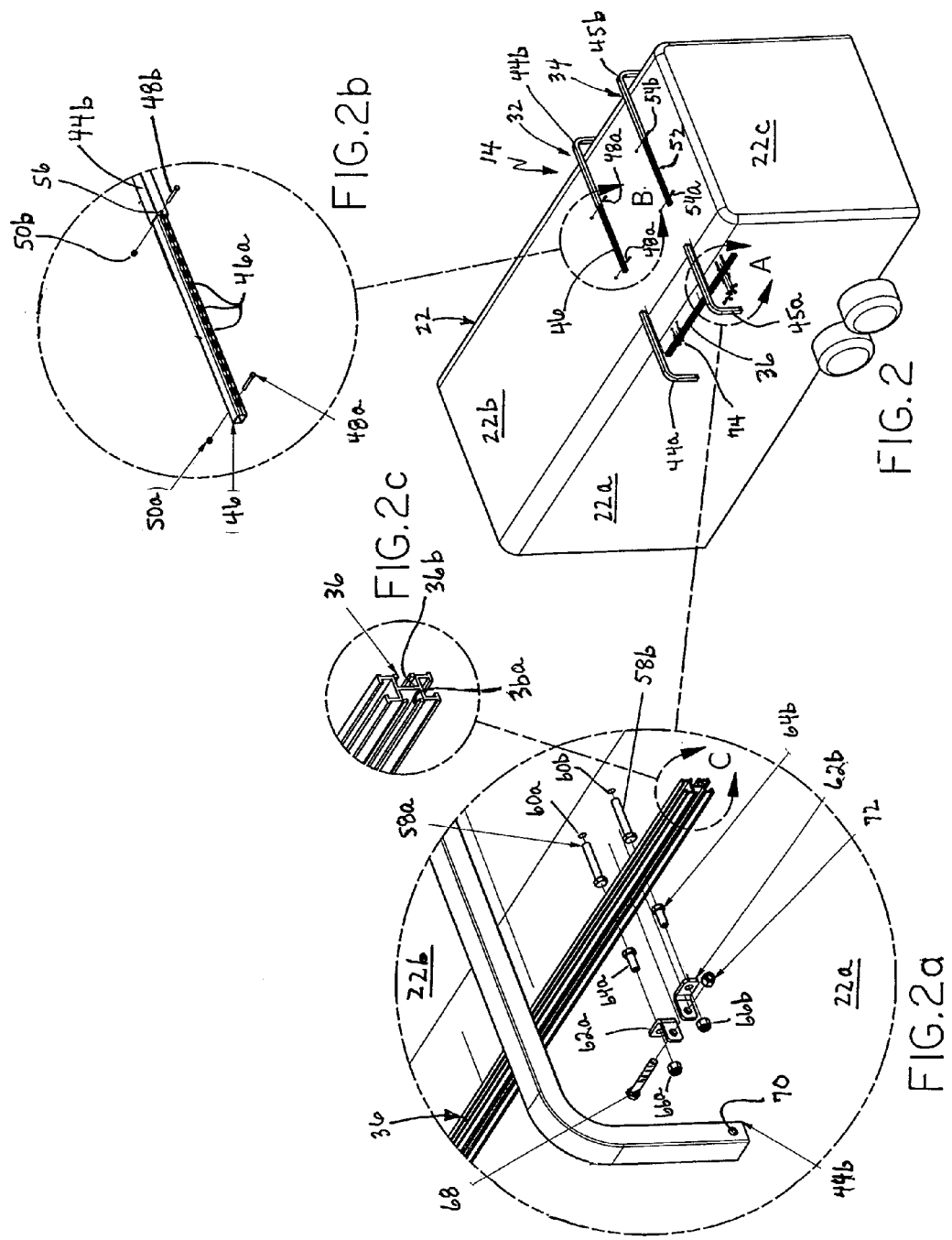
FIG. 2 is an exploded perspective view of the mounting assembly for securely attaching a storage rack to an upper portion of a vehicle in accordance with the present invention.
Figure 3:
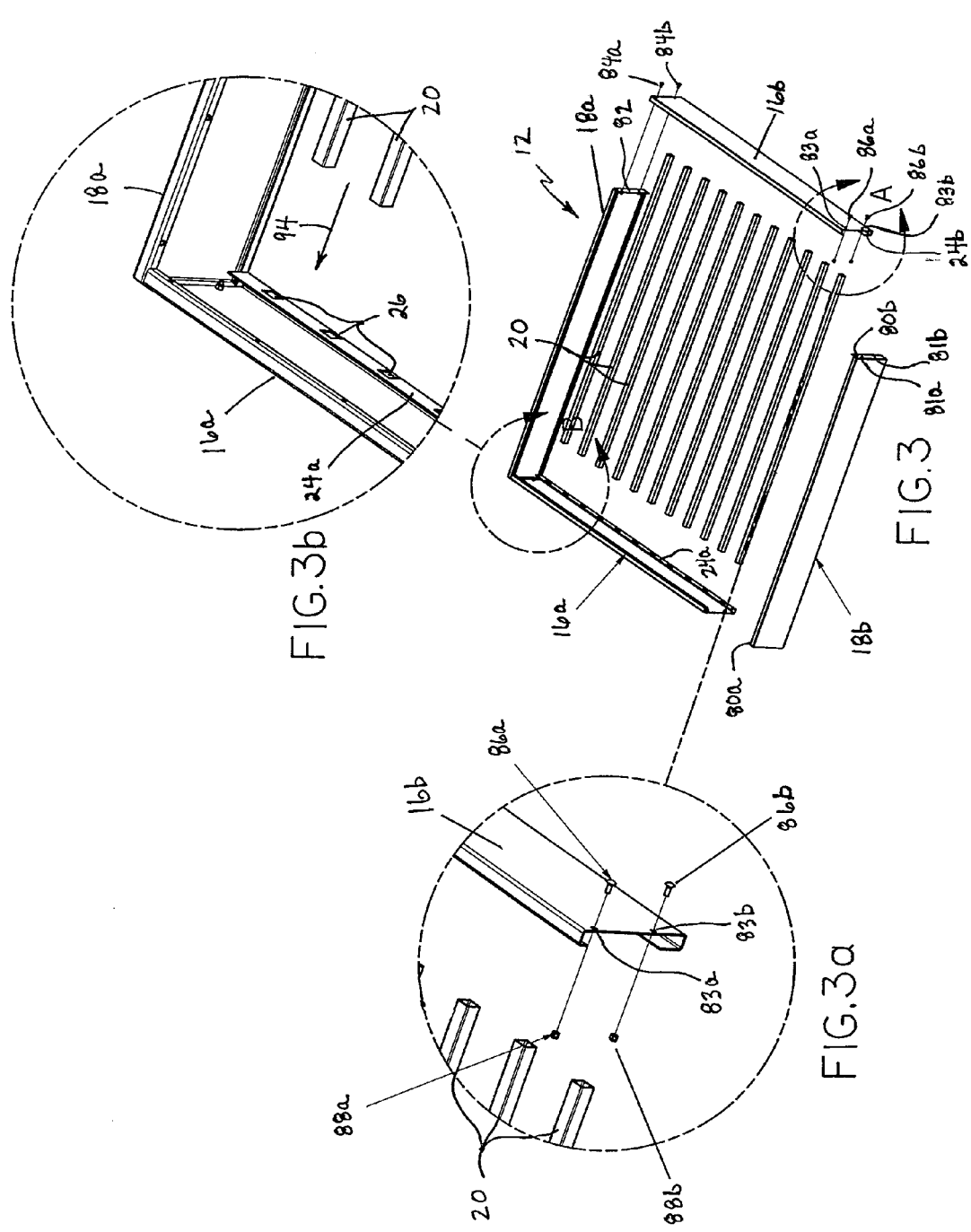
FIG. 3 is an exploded perspective view of a storage rack in accordance with the present invention.
Figure 4:
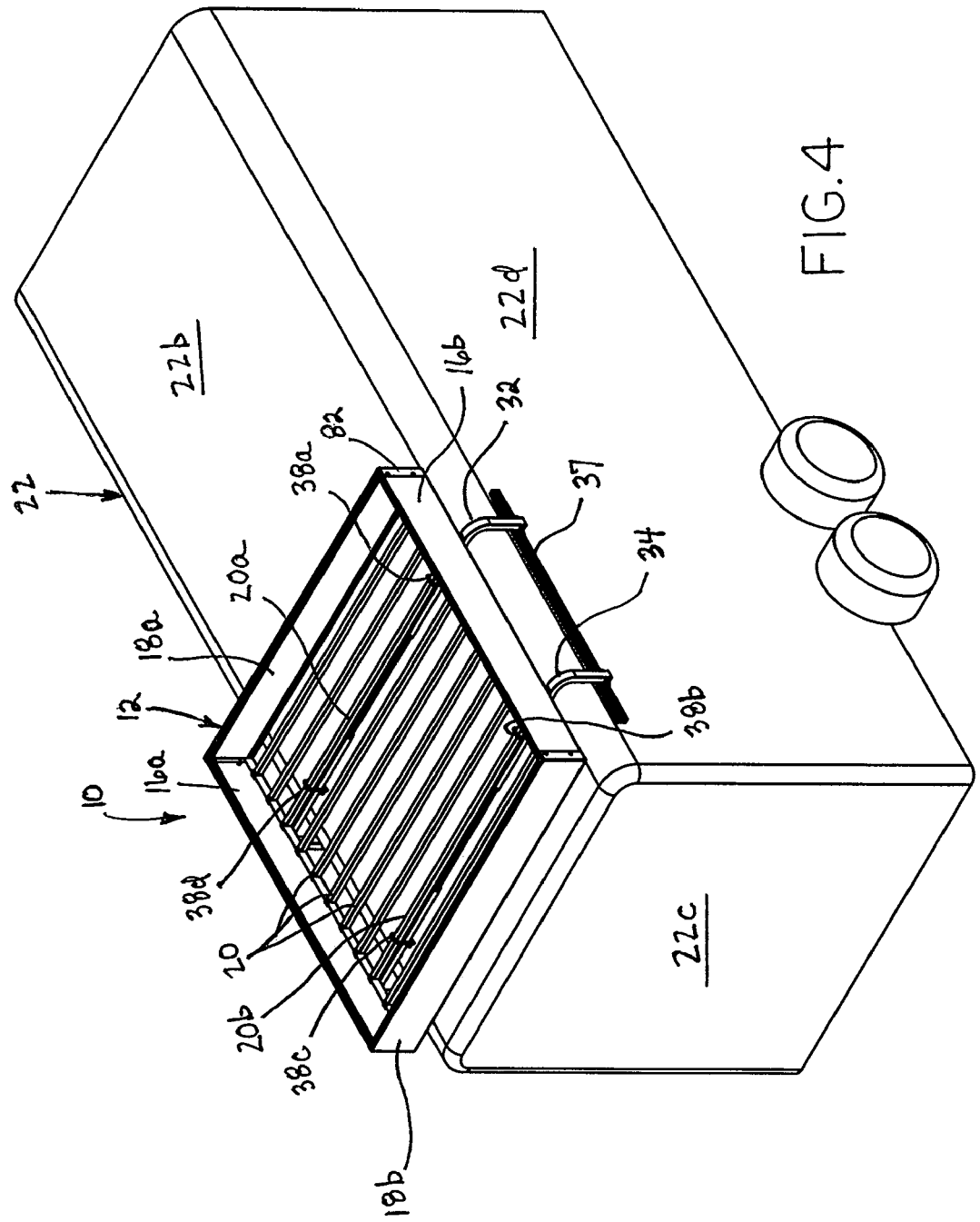
FIG. 4 is an upper perspective view of the inventive storage rack assembly mounted to an upper portion of a trailer.
Figure 5:
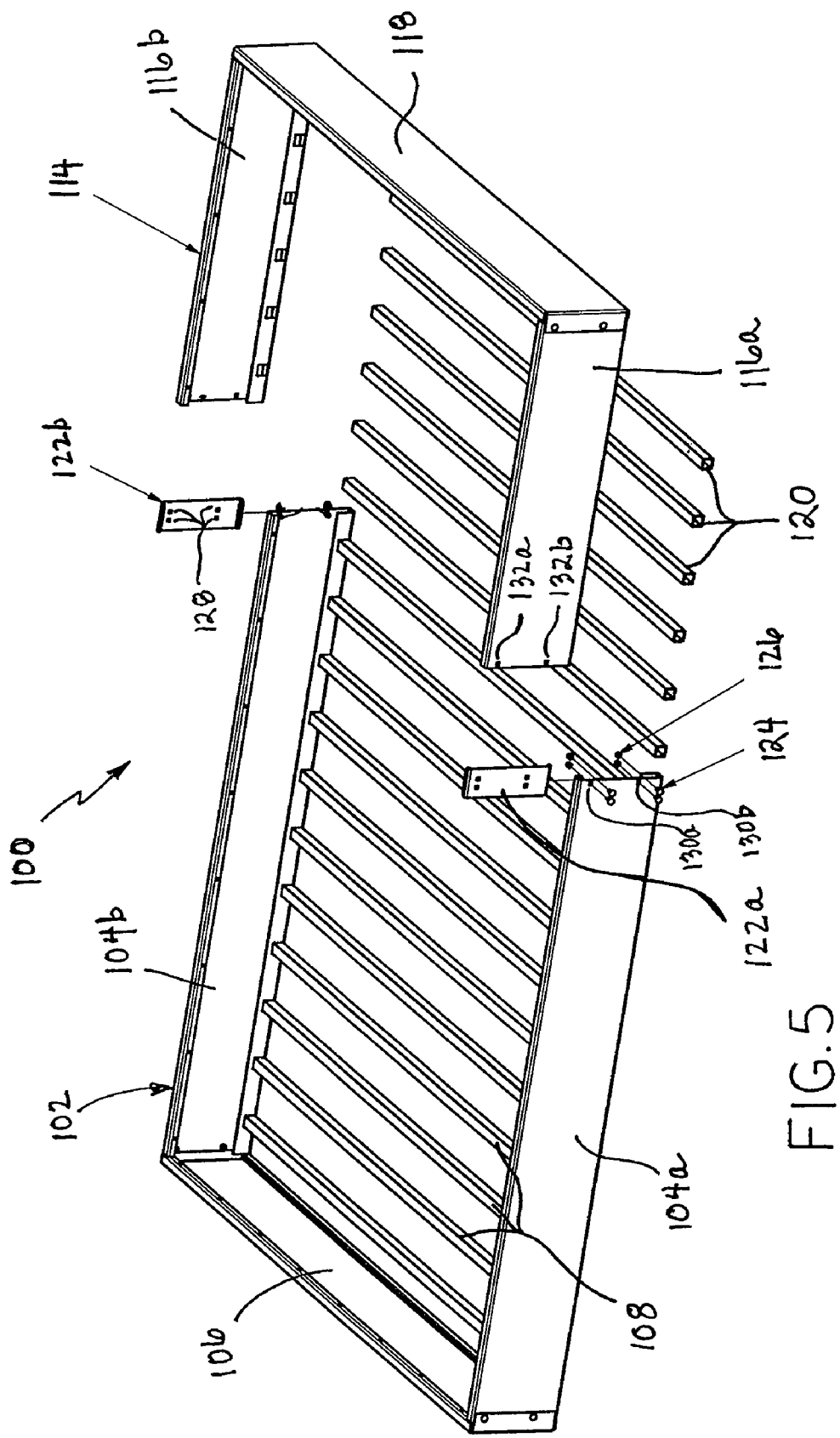
FIG. 5 is a partially exploded perspective view of a storage rack and a storage rack extension assembly in accordance with another embodiment of the present invention.
Figure 6:
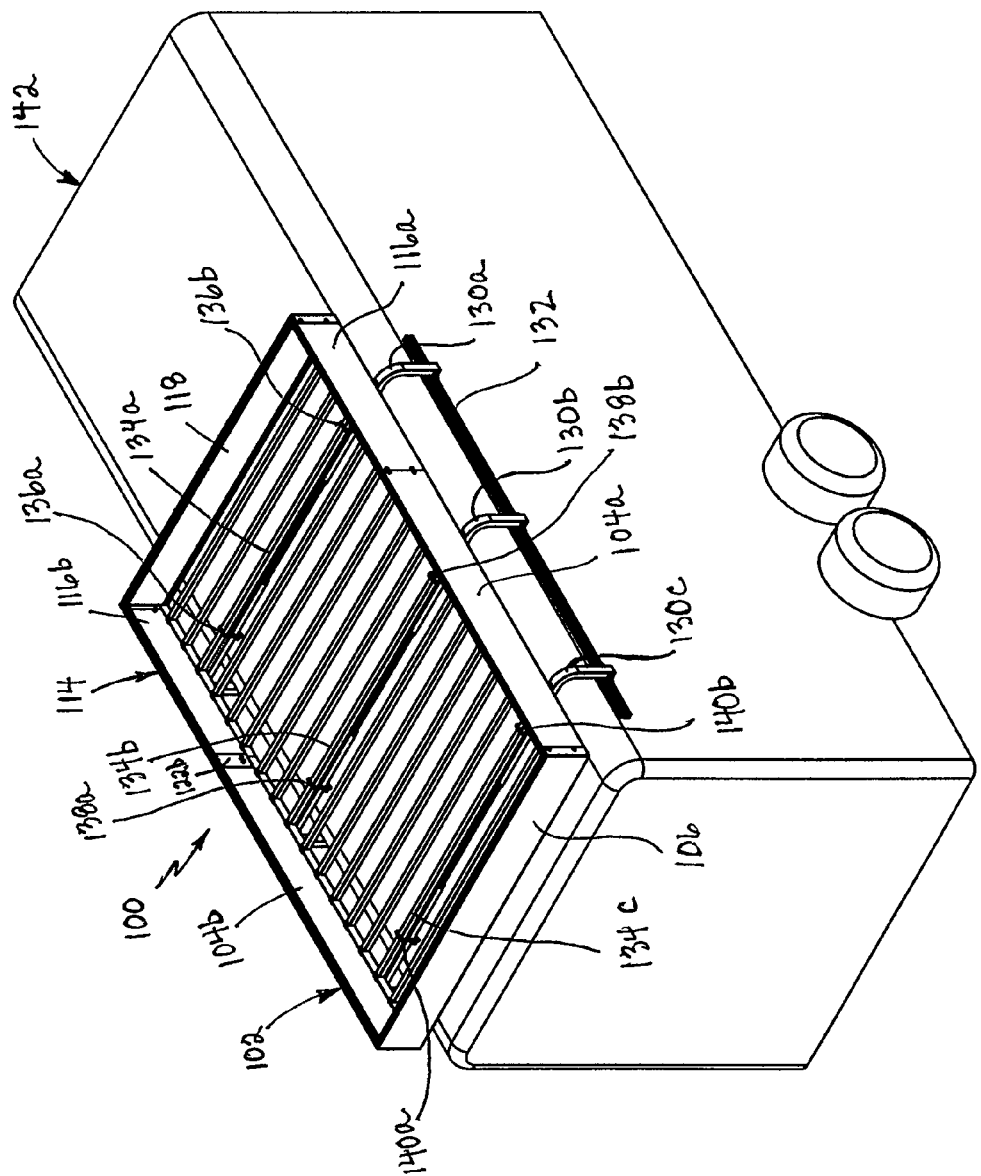
FIG. 6 is an upper perspective view of the extended storage rack assembly shown in FIG. 5 mounted to an upper portion of a trailer.

Referring to FIG. 1, there is shown a partially exploded perspective view of a storage rack assembly 10 mounted to an upper portion of a vehicle 22 in accordance with one embodiment of the present invention. FIG. 1a is an enlarged perspective view of a portion of the storage rack assembly 10 shown in FIG. 1 illustrating additional details of the structure and coupling between components of the storage rack assembly. Referring to FIG. 2, there is shown an exploded perspective view of a mounting assembly 14 attached to an upper portion of the vehicle 22 in accordance with the present invention. FIGS. 2a and 2b are enlarged perspective views of portions of the mounting assembly 14 shown in FIG. 2 illustrating additional details of the structure and connection between various components in the storage rack mounting assembly. Referring to FIG. 3, there is shown an exploded perspective view of a storage rack 12 in accordance with the present invention. FIGS. 3a and 3b are enlarged perspective views of portions of the storage rack 12 shown in FIG. 3 illustrating additional details of the structure and coupling between components in the inventive storage rack. FIG. 4 is an upper perspective view of the inventive storage rack assembly mounted to an upper portion of a trailer. With reference to FIG. 5, there is shown a partially exploded perspective view of a combination of a storage rack 102 and storage rack extension assembly 114 in accordance with another embodiment of the present invention. FIG. 6 is an upper perspective view of the extended storage rack shown in FIG. 5 mounted to an upper portion of a trailer.

Storage rack assembly 10 includes storage rack 12 and mounting assembly 14. Storage rack 12 is adapted for securely supporting and holding virtually any object sized so as to fit within the storage rack. Storage rack assembly 10 was designed for use on a horse trailer for transporting bales of hay and for providing a multi-purpose cargo storage space. However, the storage rack assembly 10 of the present invention is not limited to use on a horse trailer, as it could be used on virtually any type of vehicle, as shown for trailer 22 in FIGS. 1 and 2, for transporting virtually any type of cargo.

Storage rack 12 is comprised of left and right lateral panels 16a and 16b and front and aft panels 18a and 18b. The terms "left" and "right" are used with trailer 22 viewed from the rear looking forward. Lateral panels 16a, 16b and front and aft panels 18a, 18b form a generally rectangular structure open at its top and bottom. Front and aft panels 18a and 18b each include a flange on their opposed ends. Thus, as shown in FIGS. 3 and 4, front panel 18a includes end flange 82 on one end thereof, with the front panel's other end flange not shown for simplicity. Aft panel 18b similarly includes first and second end flanges 80a and 80b each disposed on an opposed end of the panel. Each of these end flanges 80a, 80b includes a pair of spaced apertures, as shown for the case of the second end flange 80b as including spaced apertures 81a and 81b. Opposed ends of the left and right lateral panels 16a, 16b are similarly provided with a pair of spaced apertures 83a and 83b as shown for the case of the right lateral panel 16b in FIG. 3a. With apertures 81a and 81b in aft panel 18b respectively aligned with apertures 83a and 83b in right lateral panel 16b, a first connecting pin 86a may be inserted through aligned apertures 81a and 83a and a second connecting pin 86b may be inserted through aligned apertures 81b and 83b as shown in FIGS. 3 and 3a. Nylon locking nuts 88a and 88b are then respectively attached to the first connecting pin 86a and to the second connecting pin 86b for securely attaching adjacent ends of aft panel 18b and right lateral panel 16b. It is in this manner that adjacent ends of the front and aft panels 18a, 18b and the left and right lateral panels 16a, 16b may be securely connected together to form a generally rectangular, rigid structure. Each of the left and right lateral panels 16a, 16b and the front and aft panels 18a, 18b is preferably comprised of a high strength, lightweight material, such as sheet steel, aluminum, or polyethylene.

Disposed in a spaced manner in a lower portion of the storage rack 12 are plural elongated, linear cross support members 20. Each of the cross support members 20 is preferably in the form of a hollow tube and is comprised of a high strength, lightweight material such as sheet steel, aluminum or polyethylene. Disposed on a lower, inner edge of each of the left and right lateral panels 16a, 16b is a respective flange 24a and 24b. As shown in FIG. 3b for flange 24a in left lateral panel 16a, each of the lower edge flanges includes plural spaced apertures 26 along the length thereof. Each of the apertures 26 within the lower, inner edge flanges 24a and 24b of the left and right lateral panels 16a, 16b is adapted to receive an end of a cross support member 20 as shown in FIGS. 1a and 3b. More specifically, as shown in FIG. 3b, by moving cross support members 20 in the direction of arrow 94, the ends of each of the cross support members may be positioned within a respective one of apertures 26. By inserting opposed ends of each of the cross support members 20 in corresponding, aligned apertures within a lower, inner edge flange of the left and right lateral panels 16a and 16b, the cross support members may be securely and fixedly maintained in position within a lower portion of the storage rack 12 for securely supporting cargo disposed therein. While each of the apertures 26 is shown as being generally square in shape and each of the cross support members 20 is shown as having a generally square cross section, the cross support members are not limited to this cross sectional shape and may have virtually any cross sectional shape provided that the apertures within the lower, inner flanges of the right and left lateral panels 16a, 16b have a corresponding shape and dimensions.

The storage rack's mounting assembly 14 includes forward and aft support/mounting members 32 and 34 as well as first and second mounting strips, where only the first mounting strip 36 is shown in FIGS. 1, 2, 2a and 2c as element 36 and the second mounting strip is shown in FIG. 4 as element 37. Each of the forward and aft support/mounting members 32 and 34 is comprised of three connected members. Thus, forward support/mounting member 32 includes first and second curved support braces 44a and 44b and an intermediate connecting member 46 disposed between and connecting the two curved support braces. Each of the first and second curved support braces 44a, 44b is tubular in construction as is connecting member 46. Connecting member 46 is adapted for sliding positioning within each of the first and second curved support braces as shown for the second curved support brace 44b in FIG. 2b. Connecting member 46 is provided with plural spaced apertures 46a along the length thereof. Similarly, the inner ends of each of the first and second support braces 44a, 44b is provided with a pair of opposed, aligned apertures, where one of these apertures is shown as element 56 in the second curved support brace in FIG. 2b. Apertures 56 in the second curved support brace 44b when aligned with one of the apertures 46a within the connecting member 46 are adapted to receive a coupling pin 48b inserted through the aligned apertures. A nylon lock nut 58b is positioned on one end of the coupling pin 48b for securely maintaining the coupling pin within the telescoping second curved support brace 44b and connecting member 46. A similar arrangement is disposed on a second, opposed portion of the connecting member 46, where one of its spaced apertures 46a, when aligned with a pair of aligned apertures in the first curved support brace (which is not shown in FIG. 2b for simplicity), is adapted to receive coupling pin 48a for securely maintaining the coupling pin in connection with the first curved support brace as shown in FIG. 1a. A second nylon lock nut 50a is adapted for positioning on an end of coupling pin 48a for securely maintaining connection between the connecting member 46 and the first curved support brace 44a. By telescopically inserting connecting member 46 within each of the first and second curved support braces 44a and 44b, the length of the forward support/mounting member 32 may be adjusted in accordance with the width of trailer 22 to permit the storage rack assembly 10 to be securely mounted to vehicles of various widths. The aft support/mounting member 34 is similarly provided with third and fourth curved support braces 45a and 45b as well as connecting member 52 and coupling pins 54a and 54b to allow the length of the aft support/mounting member to be varied to accommodate a wide range of vehicle widths.

Each of the forward and aft support/mounting members 32, 34 is securely attached to an upper, lateral portion of trailer 22 by means of the aforementioned first and second mounting strips 36 and 37. Each of the forward and aft support/mounting members 32, 34, as well as the aforementioned mounting strips, is comprised of a rigid, high-strength material such as steel, aluminum or polyethylene. The first mounting strip 36 will now be described in detail, it being understood that the second mounting strip 37 is similarly sized and configured to perform the same function as the first mounting strip.

Mounting strip 36 is of the double T-slot type, having first and second opposed T-slots 36a and 36b in opposed lateral portions thereof as shown in FIG. 2c. Each of the first and second T-slots 36a, 36b is adapted to receive in a tight-fitting, sliding manner the head of a bolt so as to prevent rotation of the bolt when a coupling nut is threadably positioned on the bolt. Thus, the second T-slot 36b is adapted to receive in a sliding manner first and second mounting pins 58a and 58b which are inserted through respective apertures 60a and 60b in the vehicle's side panel 22a. With the heads of each of the mounting pins 58a and 58b tightly positioned within second T-slot 36b of mounting strip 36, nuts (which are not shown in the figures for simplicity) may be tightened on the first and second mounting pins to securely position mounting strip 36 on the outer surface of the vehicle's side panel 22a in a fixed manner. Similarly, the heads of first and second threaded coupling pins 64a and 64b are tightly positioned within the mounting strip's first T-slot 36a and the threaded shafts of these coupling pins are inserted through respective apertures in first and second L-shaped brackets 62a and 62b. The first and second L-shaped brackets 62a, 62b are positioned in alignment and in closely-spaced relation with the second curved support brace 44b. The distal end of the second curved support brace 44b is provided with a pair of aligned apertures, where only one of the apertures shown as element 70 is illustrated in FIG. 2a. With the second curved support brace 44b disposed between the first and second L-shaped brackets 62a, 62b, and with apertures 70 aligned with corresponding apertures in the first and second L-shaped brackets, a third coupling pin 68 may be inserted through the aligned apertures for securely connecting the second curved brace to the trailer 22 by means of mounting strip 36. First and second threaded coupling pins 64a and 64b are respectively adapted to receive first and second nylon lock nuts 66a and 66b for securely connecting the two L-shaped brackets to mounting strip 36. Similarly, the third coupling pin 68 is adapted to receive a third nylon lock nut 72 for securely connecting the second curved support brace 44b to the first and second L-shaped brackets 62a, 62b and to mounting strip 36. A similar mounting arrangement 74 is provided on a forward end of the mounting strip 36 for securely attaching the mounting strip to the trailer's side panel 22a along the entire length of the mounting strip as shown in FIG. 2. A similar mounting arrangement is provided for the second mounting strip 37 attached to the opposed side panel 22d of the trailer 22 as shown in FIG. 4.

Storage rack 12 is securely attached to mounting assembly 14 by means of four U-shaped threaded couplers 38a-38d. First and second U-shaped threaded couplers 38a and 38d are positioned upon and engage a first cross member 20a disposed in the storage rack 12. Third and fourth U-shaped threaded couplers 38b and 38c are positioned upon and engage a second cross member 20b. First and second U-bolt brackets 40a and 40d are positioned in contact with a lower surface of the forward support/mounting member 32 and are respectively attached to the first and second U-shaped threaded couplers 38a, 38d by means of a respective pair of first and second nylon locking nuts 42a and 42b. Similarly, third and fourth U-bolt brackets 40b and 40c are positioned in contact with a lower surface of the aft support/mounting member 34 and are respectively attached to the third and fourth U-shaped threaded couplers 38b and 38c by means of respective pairs of first and second nylon locking nuts 42a and 42b. It is in this manner that the storage rack 12 is securely attached to the forward and aft support/mounting members 32, 34.

Referring to FIG. 5, there is shown a partially exploded perspective view of an extended storage rack 100 in accordance with another embodiment of the present invention. Extended storage rack 100 includes the original storage rack 102 which includes first and second lateral panels 104a and 104b, as well as an aft panel 106. Plural first cross support members 108 extend between and are connected to the first and second lateral panels 104a and 104b as in the previously-described embodiment. Extended storage rack 100 further includes an extension assembly 114 which includes third and fourth lateral panels 116a and 116b connected by means of a forward panel 118 as previously described. Plural second cross support members 120 are attached in a spaced manner between the third and fourth lateral panels 116a, 116b.

Extension assembly 114 is connected to the original storage rack 102 by means of first and second extension mounting brackets 122a and 122b. Each of the first and second extension mounting brackets 122a, 122b include plural spaced apertures 128 as shown in the second extension mounting bracket. Adjacent ends of the first and second lateral panels 104a and 104b of the original storage rack 102 are provided with a pair of spaced apertures as shown for the case of apertures 130a and 130b in the first lateral panel. Similarly, adjacent distal ends of the extension assembly's third and fourth lateral panels 116a and 116b are each provided with a pair of spaced apertures, as shown for the case of apertures 132a and 132b in the third lateral panel. Extension assembly 114 is attached to the original storage rack 102 by positioning distal ends of the first and second lateral panels 104a and 104b respectively in contact with the distal ends of the third and fourth lateral panels 116a, 116b. The first extension mounting bracket 122a is positioned over the inner surfaces of adjacent ends of the first and third lateral panels 104a and 116a which are in abutting contact. Similarly, a second extension mounting bracket 122b is positioned over adjacent distal ends of the second and fourth lateral panels 104b and 116b which are also in abutting contact. A pair of vertically aligned apertures 128 in the first extension mounting bracket 122 are positioned in alignment with first and second apertures 130a and 130b in the fourth lateral panel 104a. A second pair of vertically aligned apertures in the first extension mounting bracket 122a are positioned over vertically aligned apertures 132a and 132b in the third lateral panel 116a. A carriage bolt 124 is inserted through each pair of aligned apertures in the first extension mounting bracket 122a and the first and third lateral panels 104a and 116a for connecting the two adjacent, abutting lateral panels. A nylon locking nut 126 is attached to the inner end of each of the carriage bolts 124 for securely maintaining the bolts in position in the first extension mounting bracket 122. Similarly, a pair of vertically aligned apertures in the second extension mounting bracket 122 are positioned in alignment with a pair of apertures in each of the second and fourth lateral panels 104b and 116b. Carriage bolts, which are not shown in the figures for simplicity, are then inserted through each of the aforementioned aligned apertures in the second extension mounting bracket 122 and the second and fourth lateral panels 104b, 116b for securely connecting this pair of lateral panels. Nylon locking nuts (also now shown in the figures for simplicity) are then attached to the aforementioned carriage bolts for securely maintaining the bolts in position in connecting the two adjacent lateral panels. By incorporating one or more extension assemblies in the original storage rack, the length of the storage rack of the present invention may be increased, as desired, to accommodate longer vehicles and/or additional articles for storage.

Referring to FIG. 6, there is shown an upper perspective view of the extended storage rack 100 mounted to an upper portion of a trailer 142. Extended storage rack 100 includes first, second, and third support/mounting members 130*a*, 130*b* and 130*c*. The first support/mounting member 130*a* is attached to a first cross support member 134*a* by means of first and second U-shaped threaded couplers 136*a* and 136*b*. A second support/mounting member 130*b* is attached to a second cross support member 134*b* by means of third and fourth U-shaped threaded couplers 138*a* and 138*b*. Finally, the third support/mounting member 130*c* is attached to a third cross support member 134*c* by means of fifth and sixth U-shaped threaded couplers 140*a* and 140*b*. Each of the aforementioned U-shaped threaded couplers is maintained in position on and coupled to an associated support/mounting member and cross support member by means of a respective pair of nylon locking nuts as disclosed in the previously described embodiment, which are not shown in FIG. 6 for simplicity. Each of the first, second, and third support/mounting members 130*a*, 130*b* and 130*c* is securely mounted to an upper portion of the trailer 142 by means of a pair of mounting strips, where one of the mounting strips is shown as element 132 in FIG. 6.

While particular embodiments of the present invention have been shown and described, it will be obvious to those skilled in the relevant arts that changes and modifications may be made without departing from the invention in its broader aspects. Therefore, the aim in the appended claims is to cover all such claims and modifications as fall within the true spirit and scope of the true invention. The matter set forth in the foregoing description and accompanying drawings is offered by way of illustration only and not as a limitation. The actual scope of the invention is intended to be defined in the following claims when viewed in their proper perspective based on the prior art.

I claim:
1. A storage rack assembly for a vehicle comprising:
a forward panel and an aft panel;
first and second lateral panels, wherein said forward and aft panels are adapted for coupling to respective forward and aft end portions of said first and second lateral panels in forming a generally rectangular frame;
plural elongated, linear members arranged in a spaced parallel manner between and aligned with lower edge portions of said forward and aft panels and connected at opposed ends to lower edge portions of at least one each of said first and second side panels, wherein said generally rectangular frame extends upwardly from said plural elongated, linear members;
plural support/mounting members each connected to a respective elongated, linear member and adjustable in length for allowing the width of the storage rack assembly to be varied for accommodating vehicles of various sizes;
plural mounting brackets each attaching an end of a support/mounting member to either a first or a second mounting strip attached to an upper, lateral portion of the vehicle, wherein each mounting bracket is movable along the length of the mounting strip to which it is connected for adjusting the position of said support/mounting members on the vehicle, as desired, and
wherein each of said mounting strips includes first and second T-slots disposed in opposed lateral surfaces thereof, and wherein said first T-slot is adapted to receive first mounting pins directly coupling the mounting strip to the vehicle, and said second T-slot is adapted to receive second mounting pins coupling said support/mounting member to said mounting strip, and wherein the position of the mounting strips on the vehicle may be varied and the position of the support/mounting member on the support strip may be varied; and
an extension assembly connected to an end of the storage rack assembly for increasing the length of the storage rack assembly, wherein said extension assembly includes third and fourth lateral panels and first and second extension mounting brackets respectively connecting said first and third lateral panels and said second and fourth lateral panels in an end-to-end manner, wherein said extension assembly includes said forward panel connecting said third and fourth lateral panels.

* * * * *